(12) United States Patent
Maeda (10) Patent No.: US 7,123,313 B2
(45) Date of Patent: Oct. 17, 2006

(54) PROJECTION DISPLAY DEVICE

(75) Inventor: Tsuyoshi Maeda, Ryuo-cho (JP)

(73) Assignee: Seiko Epson Corporation, Tokyo (JP)

( * ) Notice: Subject to any disclaimer, the term of this patent is extended or adjusted under 35 U.S.C. 154(b) by 205 days.

(21) Appl. No.: 10/751,990

(22) Filed: Jan. 7, 2004

(65) Prior Publication Data
US 2005/0078387 A1 Apr. 14, 2005

(30) Foreign Application Priority Data
Feb. 21, 2003 (JP) .............................. 2003-044668

(51) Int. Cl.
*G02F 1/1335* (2006.01)
*G03B 21/26* (2006.01)

(52) U.S. Cl. .............................. 349/8; 353/31; 353/34

(58) Field of Classification Search .................... 349/8; 353/34, 31
See application file for complete search history.

(56) References Cited

U.S. PATENT DOCUMENTS

| | | | |
|---|---|---|---|
| 4,989,954 A * | 2/1991 | Yokoyama et al. | ........... 349/72 |
| 5,157,523 A | 10/1992 | Yamagishi et al. | |
| 5,691,785 A * | 11/1997 | Usui et al. | ...................... 349/8 |
| 5,826,959 A * | 10/1998 | Atsuchi | ........................ 353/20 |
| 6,062,695 A * | 5/2000 | Kakuda et al. | ............... 353/38 |
| 6,776,489 B1 * | 8/2004 | Suzuki | ........................ 353/20 |
| 2002/0196393 A1 | 12/2002 | Tashiro et al. | |

FOREIGN PATENT DOCUMENTS

| | | |
|---|---|---|
| JP | A 62-30215 | 2/1987 |
| JP | A 63-271232 | 11/1988 |
| JP | A 3-28823 | 2/1991 |
| JP | A 2000-321548 | 11/2000 |
| JP | A 2001-222017 | 8/2001 |

* cited by examiner

*Primary Examiner*—Toan Ton
(74) *Attorney, Agent, or Firm*—Oliff & Berridge, PLC

(57) ABSTRACT

To provide a highly reliable projection display device capable of being used for a long period of time without deterioration of a particular liquid crystal light valve, desirably, without any variation in color balance with time, even if a light source having a deviation of light intensity distribution is used. A projection display device in which a liquid crystal light valve includes a liquid crystal layer including TN liquid crystals having a twisted angle of substantially 90 degrees, with a polarization direction of a primary light $L_B$ incident upon the liquid crystal layer and an alignment direction of liquid crystal molecules disposed at a primary-light incident surface of the liquid crystal layer being substantially perpendicular to each other.

5 Claims, 9 Drawing Sheets

PROJECTION DISPLAY DEVICE

BACKGROUND OF THE INVENTION

1. Field of Invention

The present invention relates to a projection display device to perform light modulation using a plurality of liquid crystal light valves.

2. Description of Related Art

In recent years, a projection display device capable of providing a color display has been put to practical use. Such a related art projection display device typically includes liquid crystal light valves corresponding to three stimuli of red (R), green (G), and blue (B) display systems. One related art projection display device displays an image by modulating lights of three primary colors (R, G, and B) incident upon the corresponding liquid crystal light valves and superimposing the primary lights modulated by the corresponding liquid crystal light valves upon each other. See, for example, Japanese Unexamined Patent Application Publication No. 63-271232.

In the related art, a liquid crystal material of the liquid crystal light valves is known to decompose and deteriorate easily when it is irradiated with ultraviolet light or near ultraviolet light (blue light having a short wavelength) with high energy. Therefore, ordinarily, for example, ultraviolet (UV) cut filters to protect the liquid crystals from light of wavelengths in the ultraviolet and near ultraviolet wavelength band are disposed between a light source and the liquid crystal light valves in order to reduce or prevent the light from entering the liquid crystal light valves.

Figure 9:
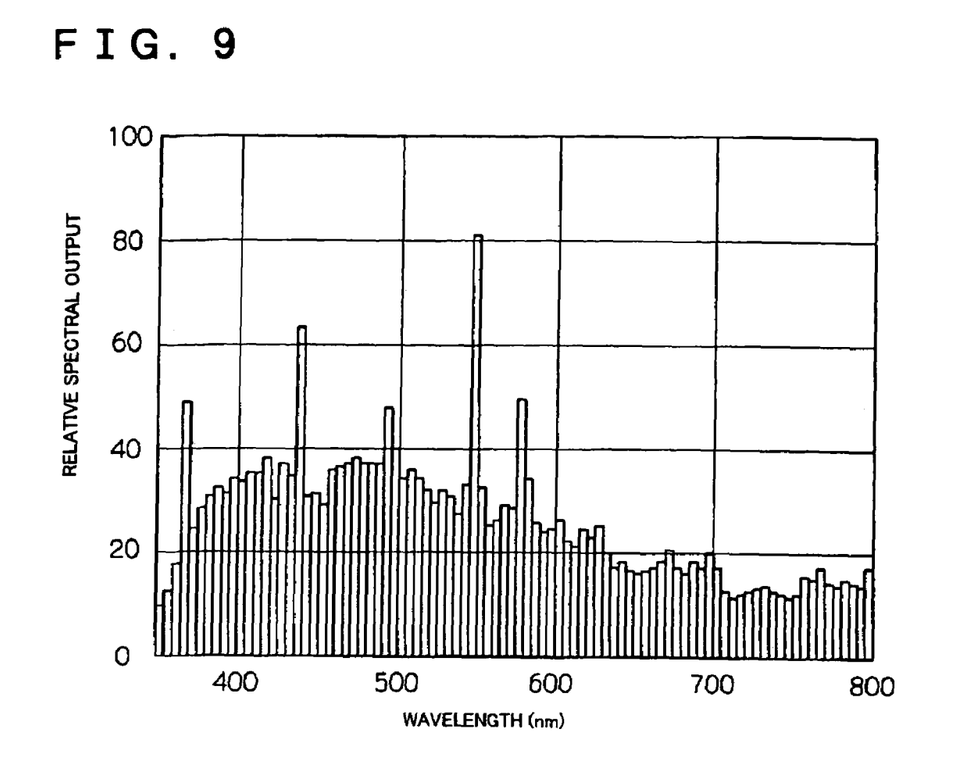
FIG. 9 is a graph of a spectral distribution of a metal halide lamp.
Figure 10:
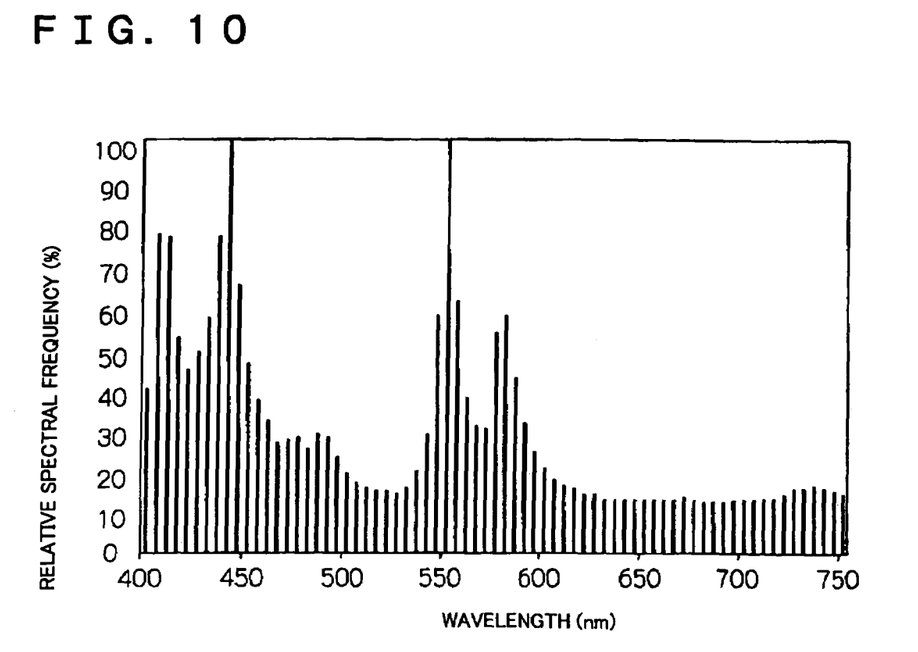
FIG. 10 is a graph of a spectral distribution of an extra-high pressure mercury lamp.

In recent years, in order to increase brightness and a color reproduction range, a projection display device is constructed using a high-intensity lamp, such as a metal halide lamp or an extra-high pressure mercury lamp, as a light source. FIG. 9 is a graph showing a spectral distribution of a metal halide lamp that lights up by alternating current. FIG. 10 is a graph showing a spectral distribution of an extra-high pressure mercury lamp that lights up by direct current. As shown in FIGS. 9 and 10, these types of lamps have a very large amount of light components having short wavelengths in the visible range.

Therefore, even if, for example, the aforementioned UV cut filters are used, the liquid crystal light valve to modulate blue light having high intensity and relatively high energy deteriorates considerably more quickly than the liquid crystal light valves to modulate the other primary lights.

SUMMARY OF THE INVENTION

The present invention has been achieved to address the aforementioned problem. The present invention provides a highly reliable projection display device capable of being used for a long period of time without deterioration of a particular liquid crystal light valve, desirably, without any variation in color balance with time, even if a light source having a deviation of light intensity distribution is used.

According to an aspect of the present invention, there is provided a projection display device including a light source; a color separating device to separate light from the light source into a plurality of primary lights; and a plurality of liquid crystal light valves disposed in correspondence with the primary lights. Each liquid crystal light valve includes a liquid crystal layer including twisted nematic liquid crystals having a twisted angle of approximately 90 degrees. Among the plurality of liquid crystal light valves, a liquid crystal light valve disposed in correspondence with a primary light with a blue hue is such that an alignment direction of liquid crystal molecules disposed at a primary-light incident surface of the liquid crystal layer of the liquid crystal light valve disposed in correspondence with the primary light with the blue hue is substantially perpendicular to a polarization direction of the primary light with the blue hue incident upon the liquid crystal layer of the liquid crystal light valve disposed in correspondence with the primary light with the blue hue.

The projection display device having the above-described structure performs a displaying operation by making use of the optical rotatory property of twisted nematic (TN) liquid crystals having a twisted angle of approximately 90 degrees in the liquid crystal light valve for modulating light with a blue hue. Since this primary light impinges upon the liquid crystal layer of the liquid crystal light valve for modulating the light with the blue hue so that the alignment direction of the liquid crystal molecules disposed at the primary-light incident surface of the liquid crystal layer and the polarization direction of the light incident upon the liquid crystal layer are perpendicular to each other, the polarized light passing through the liquid crystal layer crosses the liquid crystal molecules in directions in which light absorbance is small (that is, molecular short-axis directions), and is modulated. By this, deterioration is reduced or prevented from occurring in the liquid crystals of the liquid crystal light valve that is illuminated with light having a wavelength in a short wavelength region (that is, light with a blue hue) having relatively high energy. Therefore, the liquid crystal light valve and the projection display device have a longer life.

The present invention may be easily applied to a multiple-primary-color-type projection display device using four or more primary colors. For example, when a displaying operation is performed using six primary colors with two primary colors, each being used with respect to three stimuli of red (R), green (G), and blue (B) display systems, the above-described structure may be used for liquid crystal light valves that are disposed in correspondence with two primary lights with a blue hue and for polarized light that is incident upon these liquid crystal light valves.

In the projection display device of an aspect of the present invention, the light source may have an intensity that is equal to or greater than 10,000 lm. By virtue of such a structure, it is possible to provide a projection display device which provides a bright display with excellent color reproducibility and which has a long life.

In the projection display device of an aspect of the present invention, the light source may be a metal halide lamp or an extra-high pressure mercury lamp. By virtue of such a structure, it is possible to easily increase the brightness of the display. In the related structure, these intense light sources, including a large amount of light components in a short wavelength region, deteriorate the light valve for modulating light having wavelengths in the short wavelength region. In the projection display device of an aspect of the present invention, however, since, as mentioned above, the life of the liquid crystal light valve corresponding to the primary light with a blue hue is prolonged, the projection display device of the present invention is very effectively used when these types of lamps are used as light sources.

The projection display device may further include a polarizer disposed at a primary-light incident side of the liquid crystal layer of the liquid crystal light valve disposed in correspondence with the primary light with the blue hue, the polarizer having a polarization axis that is disposed substantially perpendicular to the alignment direction of the liquid crystal molecules disposed at the primary-light incident surface of the liquid crystal layer of the liquid crystal light valve disposed in correspondence with the primary light with the blue hue. According to this structure, it is possible to easily define the alignment direction of the liquid crystal molecules and the polarization direction of the primary light of the liquid crystal light valve whose life is prolonged. In addition, since structural members of the liquid crystal light valve are not considerably changed, the projection display device can be very easily produced.

In the projection display device, among the plurality of liquid crystal light valves, the other liquid crystal light valves disposed in correspondence with primary lights, other than the primary light with the blue hue, may be such that polarization directions of the primary lights, other than the primary light with the blue hue, incident upon the liquid crystal layers of the respective liquid crystal light valves disposed in correspondence with the primary lights, other than the primary light with the blue hue, and alignment directions of liquid crystal molecules disposed at primary-light incident surfaces of the liquid crystal layers of the respective liquid crystal light valves disposed in correspondence with the primary lights, other than the primary light with the blue hue, are substantially parallel to each other.

Although, in the related art projection display device, the life of the liquid crystal light valve for blue light is short, the life of the liquid crystal light valve for modulating light with a blue hue is increased in the structure of the present invention as mentioned above. It is possible to prolong the lives of the other liquid crystal light valves for modulating light with hues other than a blue hue (that is, light with a red hue and light with a green hue) by using the structure of the liquid crystal light valve for light with a blue hue. However, in terms of color balance in the display resulting from synthesizing the modulated lights, it is desirable that deterioration rates with age of the liquid crystal light valves corresponding to the primary lights be the same. Therefore, by applying the structure used in the present invention only to the light valve for modulating light with a blue hue as in the above-described structure, the lives of the liquid crystal light valves are the same, so that the frequency with which a change in the color balance occurs due to deterioration of the liquid crystal light valves with time can be reduced.

DETAILED DESCRIPTION OF EXEMPLARY EMBODIMENTS

Hereunder, a description of exemplary embodiments of the present invention will be given with reference to the figures.

Structure of Projection Display Device

Figure 1:
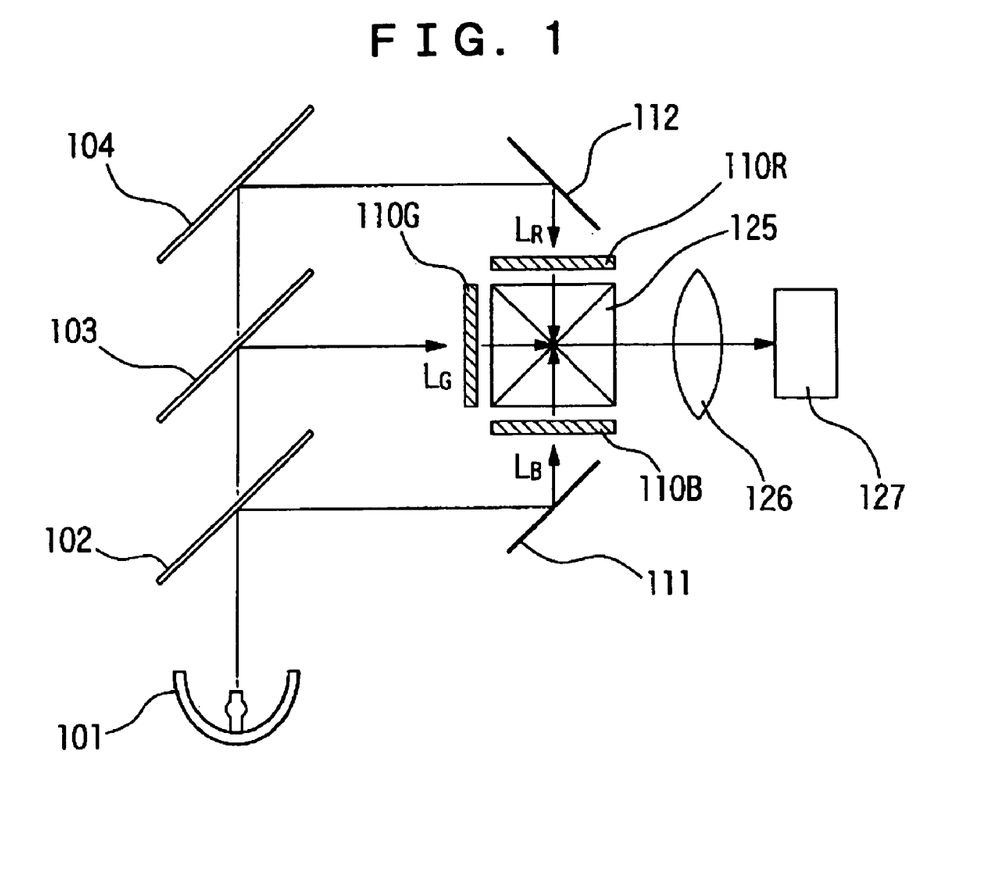
FIG. 1 is a schematic view of the structure of a projection display device of an exemplary embodiment.

FIG. 1 is a schematic view of the structure of a projection display device of an exemplary embodiment. In FIG. 1, reference numeral 101 denotes a light source, reference numerals 102 to 104 denote dichroic mirrors functioning as a color separating device, reference numerals 110R, 110G, and 110B denote liquid crystal light valves functioning as a light modulating device, reference numerals 111 and 112 denote reflective mirrors, reference numeral 125 denotes a dichroic prism functioning as an image superimposing device, reference numeral 126 denotes a projection lens functioning as an image projecting device, and reference numeral 127 denotes a member to project an image thereon, such as a screen. In other words, the projection display device of the exemplary embodiment is a three-plate-type projection color display device. In the figures that follow, in order for each layer and each part to be drawn with sizes that make them visible, they are drawn to different scales.

Of light beams from the primary light source 101, blue light (primary light) $L_B$ is reflected by the dichroic mirror 102, and red light $L_R$ and green light $L_G$ are transmitted through the dichroic mirror 102. The blue light $L_B$ reflected by the dichroic mirror 102 is reflected by the reflective mirror 111, and, then, impinges upon the liquid crystal light valve 110B. Of the lights transmitted through the dichroic mirror 102, the green light (primary light) $L_G$ is reflected by the dichroic mirror 103, and, then, impinges upon the liquid crystal light valve 110G. The red light (primary light) $L_R$ transmitted through the dichroic mirror 103 is reflected by the reflective mirror 112, and, then, impinges upon the liquid crystal light valve 110R.

The liquid crystal light valves 110R, 110G, and 110B are disposed at respective three surfaces of the dichroic prism 125. Lights modulated by the respective liquid crystal light valves are superimposed by the dichroic prism 125 in order to project an image onto the member 127 through the projection lens 126.

Each of the liquid crystal light valves 110R, 110B, and 110G of the projection display device of the exemplary embodiment may almost exclusively be made up of an active matrix liquid crystal panel using a thin film transistor (hereinafter "TFT") as a switching element.

Figure 2:
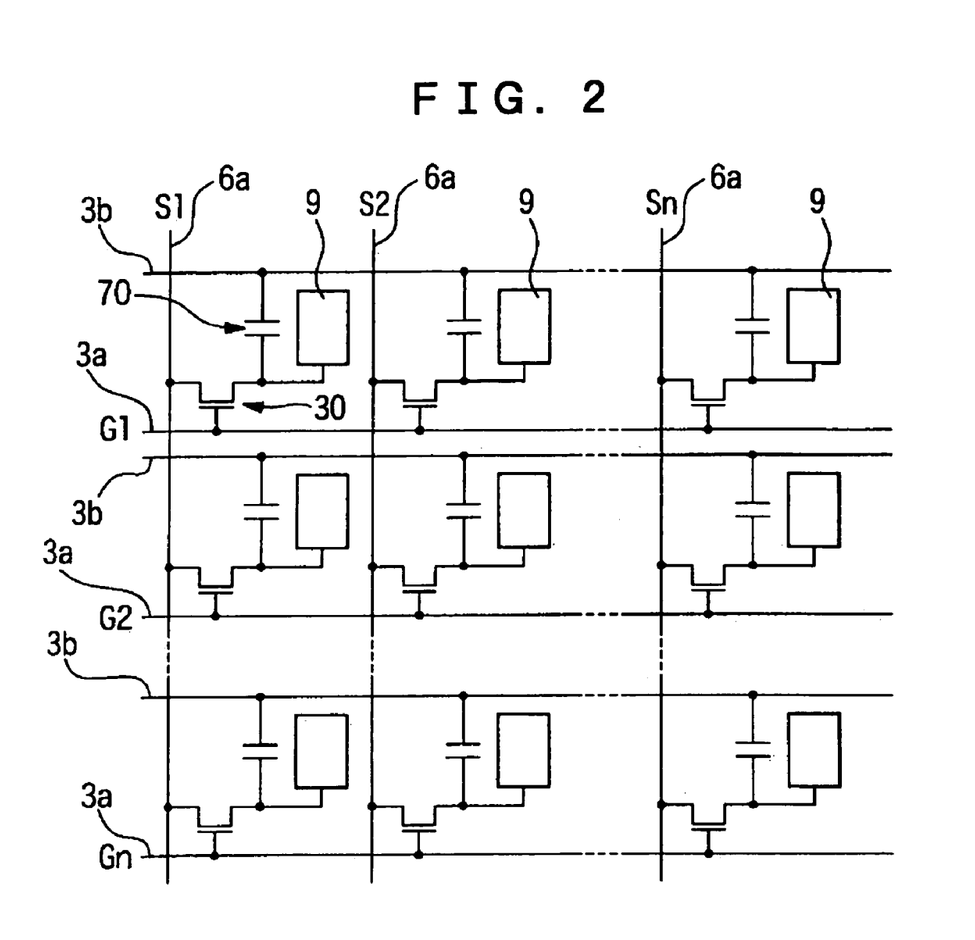
FIG. 2 shows the circuit structure of a liquid crystal panel in an exemplary embodiment.
Figure 3:
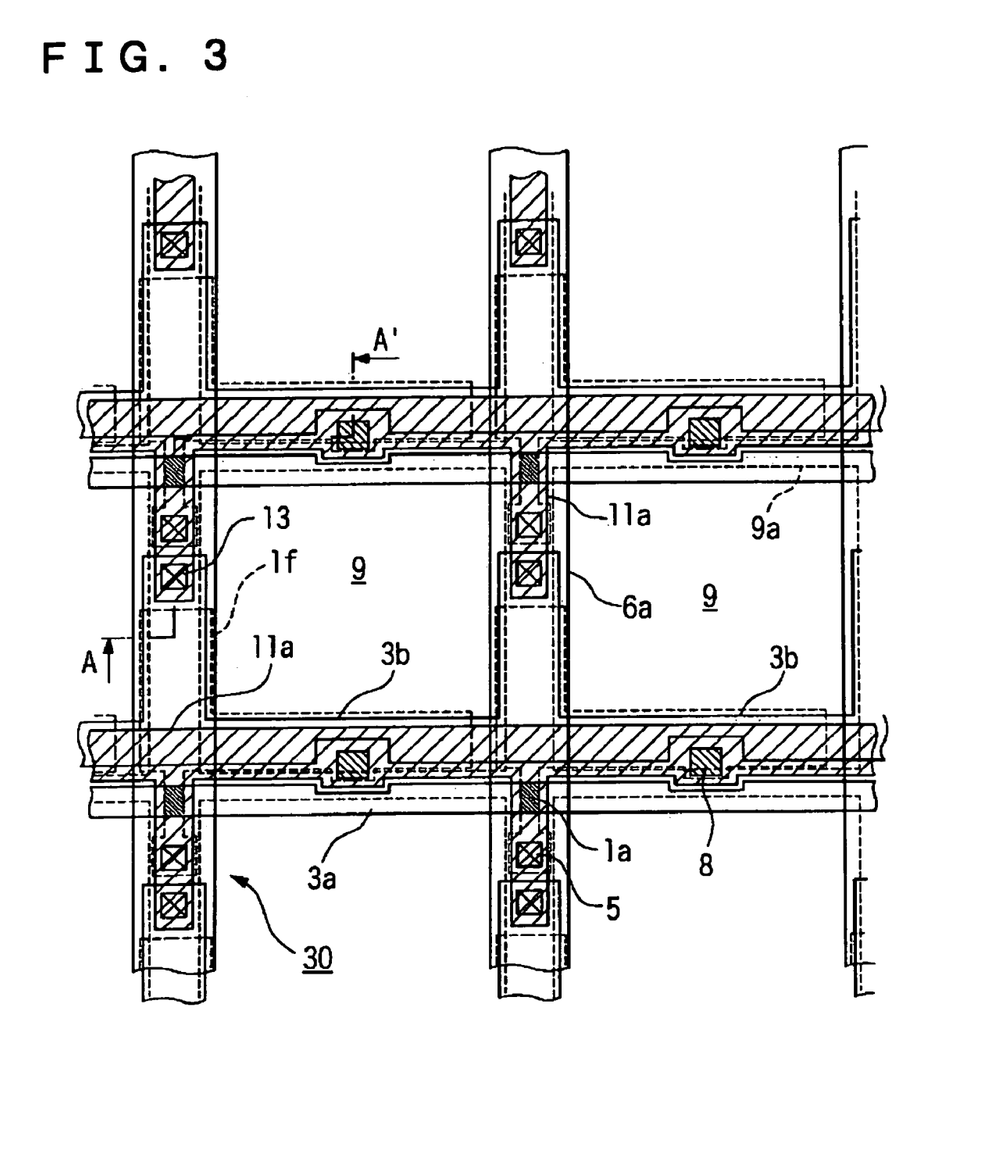
FIG. 3 is a plan view of the circuit structure.
Figure 4:
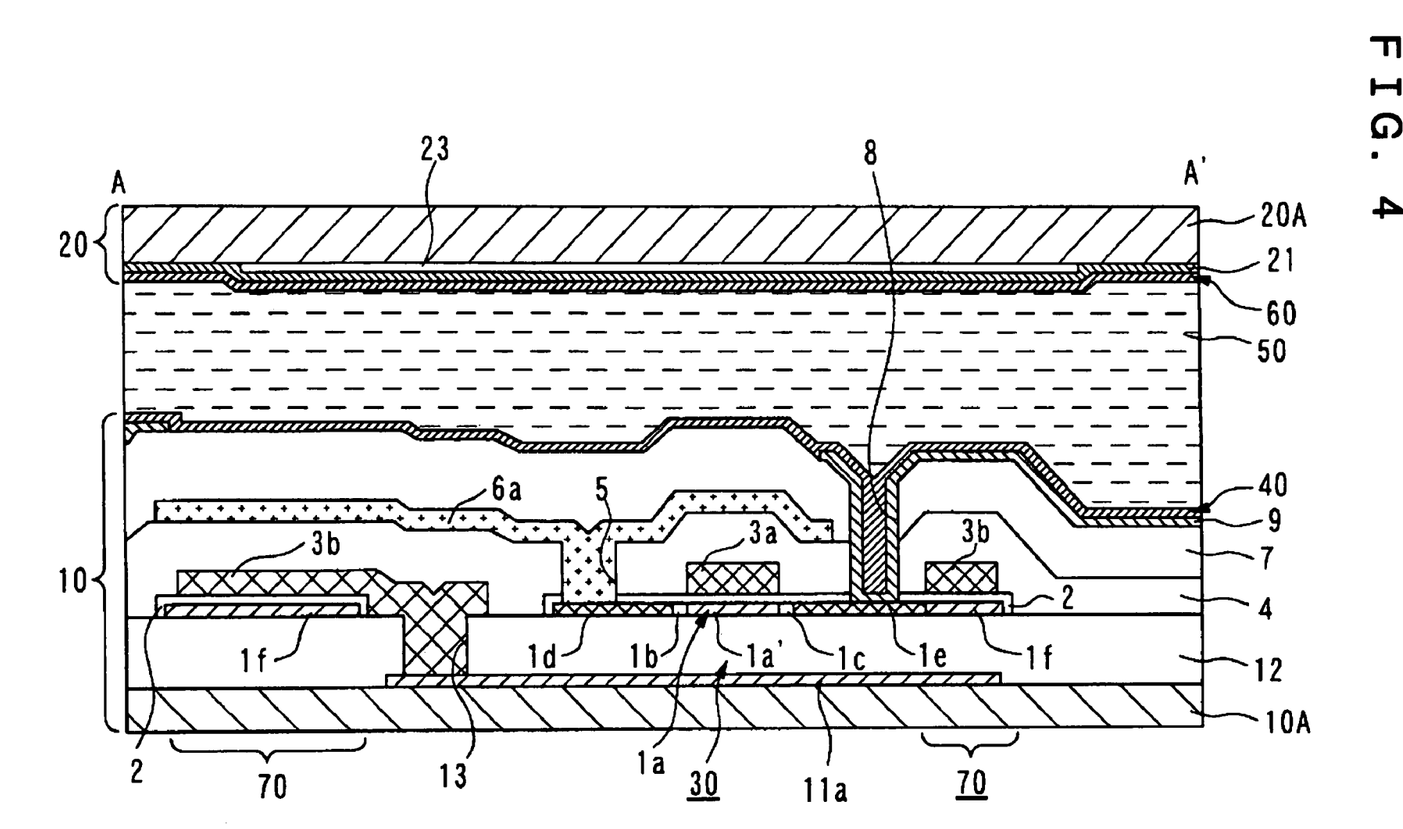
FIG. 4 is a sectional view of the circuit structure.

FIG. 2 illustrates an equivalent circuit of a plurality of dots disposed in a matrix and making up image display areas of a liquid crystal panel. FIG. 3 is a plan view of the structure of one dot of a TFT array substrate. FIG. 4 is a partial sectional view taken along plane A–A' of FIG. 3.

In the liquid crystal panel in the exemplary embodiment, as shown in FIG. 2, pixel electrodes 9 and TFT elements 30, serving as switching elements to control passage of current to the pixel electrodes 9, are formed at the pixels that are disposed in a matrix and that make up the image display areas. Data lines 6a to supply image signals are electrically connected to the sources of the respective TFT elements 30. Image signals S1, S2, . . . , Sn, which are written to the data lines 6a, are line-sequentially supplied to the data lines 6a in that order or are supplied to groups of neighboring data lines 6a.

Scanning lines 3a are electrically connected to the gates of the respective TFT elements 30. Scanning signals G1, G2, . . . , Gm are line-sequentially applied in pulses at a predetermined timing to the scanning lines 3a. The pixel electrodes 9 are electrically connected to the drains of the respective TFT elements 30. By turning on the TFT elements 30, serving as switching elements, for a fixed period of time, the image signals S1, S2, . . . , Sn supplied from the data lines 6a are written at a predetermined timing.

The image signals S1, S2, . . . , Sn, of a predetermined level written onto the liquid crystals through the pixel electrodes 9 are held for a fixed period of time between the pixel electrodes 9 and a common electrode (described later). By changing the order and alignment of a molecular assembly by an applied voltage level, the liquid crystals can provide grayshade as a result of modulating light. Here, in order to reduce or prevent leakage of the held image signals, storage capacitors 70 are additionally disposed parallel to liquid crystal capacitances provided between the image electrodes 9 and the common electrode.

Next, based on FIG. 3, the structure of the liquid crystal panel in plan view used in an aspect of the present invention will be described. As shown in FIG. 3, the pixel electrodes 9 (contours indicated by broken-line portions 9a), which are rectangular and which are formed of a transparent conductive material, such as indium tin oxide (hereafter "ITO"), are disposed in a matrix on the TFT array substrate. The data lines 6a and the scanning lines 3a and capacitance lines 3b are disposed along vertical and horizontal boundaries of the pixel electrodes 9. In the exemplary embodiment, areas where the pixel electrodes 9 are formed and where the data lines 6a, the scanning lines 3a, and the capacitance lines 3b are formed so as to surround the respective pixel electrodes 9 correspond to the pixels, so that the liquid crystal panel has a structure which allows it to perform a display operation at each pixel disposed in a matrix.

The data lines 6a are electrically connected through contact holes 5 to source regions (described later) of semiconductor layers 1a, which are, for example, polysilicon layers, of the TFT elements 30, respectively. The pixel electrodes 9 are electrically connected to drain regions (described later) of the semiconductor layers 1a through contact holes 8. The scanning lines 3a are disposed so as to oppose channel regions (that is, areas shaded with lines slanted upwards and leftwards in FIG. 3) of the semiconductor layers 1a, and function as gate electrodes where they oppose the channel regions.

Each capacitance line 3b includes a main line extending substantially in a straight line along its corresponding scanning line 3a (that is, a first area formed along its corresponding scanning line 3a in plan view) and a protrusion protruding upward in FIG. 3 along its corresponding data line 6a from a location where it crosses the corresponding data line 6a (that is, a second area extending along its corresponding data line 6a in plan view).

In FIG. 3, a plurality of first light-shielding films 11a are disposed in areas that are shaded by lines slanted upwards and rightwards.

Next, the cross-sectional structure of the liquid crystal panel used in the exemplary embodiment will be described with reference to FIG. 4. As shown in FIG. 4, in the liquid crystal panel used in the exemplary embodiment, a liquid crystal layer 50, formed of twisted nematic (TN) liquid crystals having a twisted angle of 90 degrees, is interposed between a TFT array substrate 10 and a substrate 20 opposing the substrate 10. The TFT array substrate 10 is almost exclusively made up of a substrate body 10A formed of a light-transmissive material, such as quartz, and the TFT elements 30, the pixel electrodes 9, and an alignment layer 40, which are formed at a liquid-crystal-layer-50-side surface of the substrate body 10A. The opposing substrate 20 is almost exclusively made up of a substrate body 20A formed of a light-transmissive material, such as quartz or glass; a common electrode 21 and an alignment layer 60, which are formed at a liquid-crystal-layer-50-side surface of the substrate body 20A.

In the TFT array substrate 10, the pixel electrodes 9 are disposed at the liquid-crystal-layer-50-side surface of the substrate body 10A, and the switching TFT elements 30 to switch controlling the pixel electrodes 9 are disposed adjacent to the respective pixel electrodes 9. The pixel switching TFT elements 30 have a lightly doped drain (LDD) structure, and include the respective scanning lines 3a; channel regions 1a' of the respective semiconductor layers 1a, where the channel are formed by electrical fields from the scanning lines 3a; gate insulating films 2 to insulate the respective scanning lines 3a and the respective semiconductor layers 1a; the data lines 6a; lightly doped source regions 1b and lightly doped drain regions 1c of the respective semiconductor layers 1a; and heavily doped source regions 1d and heavily doped drain regions 1e of the respective semiconductor layers 1a.

Second interlayer insulating films 4 including the contact holes 5 extending to the respective heavily doped source regions 1d and the contact holes 8 extending to the respective heavily doped drain regions 1e are formed above the substrate body 10A, that is, above the scanning lines 3a and the gate insulating films 2. In other words, each data line 6a is electrically connected to its corresponding heavily doped source region 1d through its corresponding contact hole 5 passing through its corresponding second interlayer insulating film 4. In addition, third interlayer insulating films 7 including the contact holes 8 extending to the respective heavily doped drain regions 1e are formed above the data lines 6a and the second interlayer insulating films 4. In other words, each heavily doped drain region 1e is electrically connected to its corresponding pixel electrode 9 through the corresponding contact hole 8 passing through the corresponding second interlayer insulating film 4 and the corresponding third interlayer insulating film 7.

In the liquid crystal panel, each gate insulating film 2 is disposed so as to extend from a location opposing its corresponding scanning line 3a and is used as a dielectric film, each semiconductor layer 1a is extended and is defined as a first storage capacitor electrode 1f, and a portion of each capacitance line 3b opposing its corresponding dielectric film 2 and first storage capacitor 1f is defined as a second storage capacitor electrode, so that each storage capacitor 70 is formed.

At the liquid-crystal-layer-50-side surface of the substrate body 10A of the TFT array substrate 10, the first light-shielding films 11a are disposed in areas where the respective pixel switching TFT elements 30 are formed in order to reduce or prevent light returning towards the liquid crystal layer 50 after passing through the TFT array substrate 10 and being reflected by the illustrated lower surface (interface between the TFT array substrate 10 and air) of the TFT array substrate 10 from entering at least the channel regions 1a', the lightly doped source regions 1b, and the lightly doped drain regions 1c of the respective semiconductor layers 1a. First interlayer insulating films 12 are formed between the respective first light-shielding films 11a and pixel switching TFT elements 30 in order to electrically insulate the semiconductor layers 1a of the respective pixel switching TFT elements 30 from the respective first light-shielding films 11a. As shown in FIG. 3, each first light-shielding film 11a is formed so as to electrically connect to the upper capacitance line 3b or lower capacitance line 3b through its corresponding contact hole 13 in addition to being disposed at the TFT array substrate 10.

The alignment layer 40 is formed on the surface of the TFT array substrate 10 closest to the liquid crystal layer 50, that is, on the pixel electrodes 9 and the third interlayer insulating films 7 in order to control the alignment of liquid crystal molecules in the liquid crystal layer 50.

At the liquid-crystal-layer-50-side surface of the substrate body 20A of the opposing substrate 20, second light-shielding films 23 are disposed in areas opposing the area where the data lines 6a, the scanning lines 3a, and the pixel switching TFT elements 30 are formed, that is, in areas other than open areas of the pixel portions, in order to reduce or prevent incident light from entering the channel regions 1a', the lightly doped source regions 1b, and the lightly doped drain regions 1c of the semiconductor layers 1a of the respective pixel switching TFT elements 30. The common electrode 21, which is formed of, for example, ITO, is disposed over substantially the entire liquid-crystal-layer-50 side of the substrate body 20A having the second light-shielding films 23 formed thereon. The alignment layer 60 is formed adjacent to the liquid crystal layer 50 in order to control the alignment of the liquid crystal molecules in the liquid crystal layer 50.

In the projection display device of the exemplary embodiment having the above-described structure, the liquid crystal light valve 110B for modulating blue light and the other liquid crystal light valves 110R and 110G are used to differ the polarization states of the primary lights that are incident upon the liquid crystal layers 50.

Figure 5A:
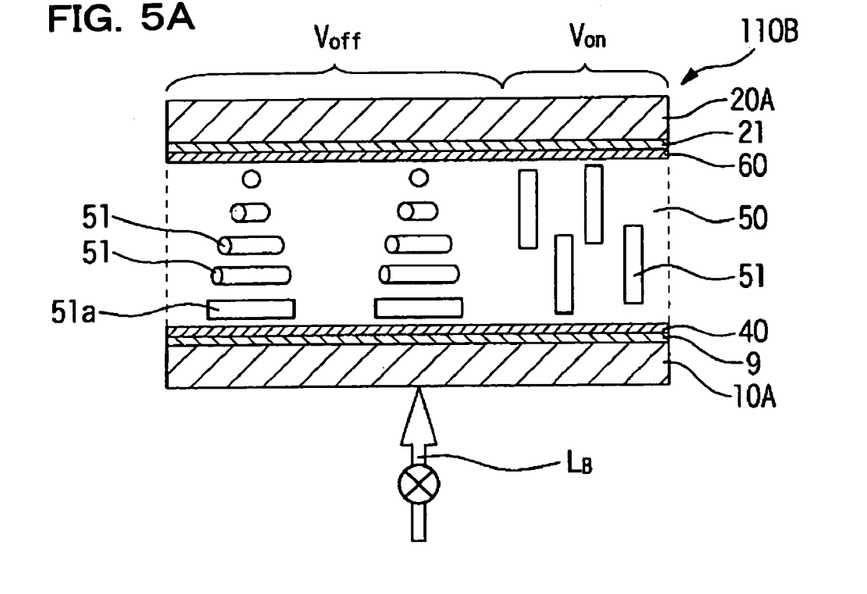
FIG. 5(A) is an explanatory sectional view of a liquid crystal light valve for modulating blue light.
Figure 5B:
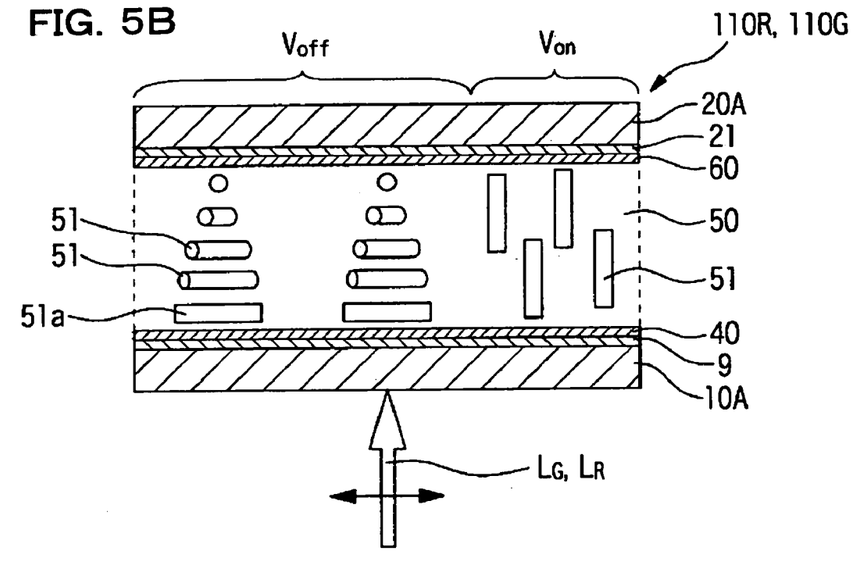
FIG. 5(B) is an explanatory sectional view of a liquid crystal light valve for modulating red light or green light.

FIG. 5(A) is an explanatory sectional view of the liquid crystal light valve 110B, and FIG. 5(B) is an explanatory sectional view of the liquid crystal light valve 110R or 110G. In each of these figures, reference numerals 51 denote liquid crystal molecules of the liquid crystal layer 50, the left area (indicated by Voff) shows the state of alignment of the liquid crystal molecules 51 when a voltage is not applied between the pixel electrodes 9 and the common electrode 21, and the right area (indicated by Von) shows the liquid crystal molecules 51 aligned perpendicular to the substrate by the application of a voltage between the electrodes 9 and the electrode 21. In the projection display device of the exemplary embodiment, as shown in FIG. 5(A), the blue light $L_B$ incident upon the liquid crystal layer 50 of the liquid crystal light valve 110B is linearly polarized light perpendicular to the figure plane, and has a polarization direction that is perpendicular to the alignment direction of liquid crystal molecules 51a (parallel to the figure plane) disposed at a primary-light-incident surface of the liquid crystal layer 50 (contact surface between the liquid crystal layer 50 and the alignment layer 40).

As shown in FIG. 5(B), the red light $L_R$ and the green light $L_G$ that are incident upon their respective liquid crystal light valves 110R and 110G are linearly polarized lights parallel to the figure plane, and have polarization directions parallel to the alignment direction of the liquid crystal molecules 51a (parallel to the figure plane) disposed at primary-light-incident surfaces of the respective liquid crystal layers 50 (contact surfaces between the liquid crystal layers 50 and the respective alignment layers 40).

When, in the liquid crystal light valve 110B for modulating blue light, the polarization direction of the incident blue light $L_B$ and the direction of alignment of the liquid crystal molecules 51a are set as mentioned above, the projection display device of the exemplary embodiment makes it possible to effectively reduce or prevent deterioration of the liquid crystal light valve 110B caused by irradiation of the liquid crystal layer 50 of the liquid crystal light valve 110B with light, and, thus, to considerably prolong the life of the liquid crystal light valve 110B. Actually, the inventor et al. tested the life of the liquid crystal light valve 110B using an extra-high pressure mercury lamp as a light source having an intensity of 25,000 lm and a spectral distribution, such as that shown in FIG. 10, and found that the projection display device of the exemplary embodiment has a life of at least 30,000 hours.

Figure 6:
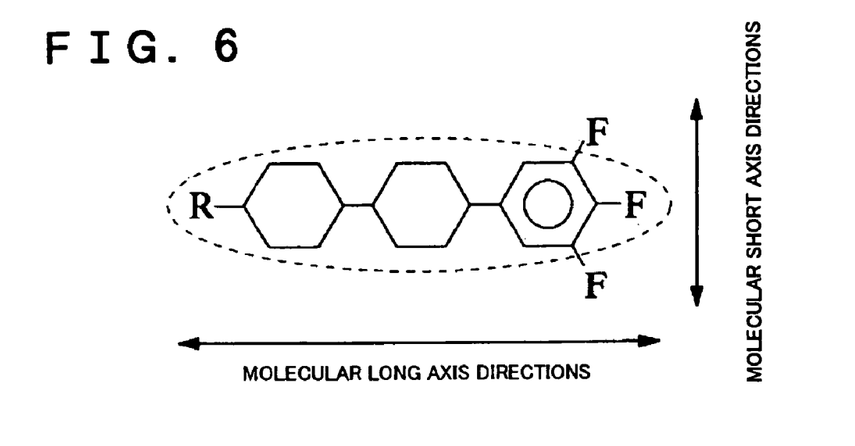
FIG. 6 illustrates an example of a liquid crystal molecular structure.

FIG. 6 illustrates an example of a liquid crystal molecular structure. As shown in this figure, the liquid crystal molecules are disposed in substantially one direction, with the illustrated horizontal directions being the long axis directions of the liquid crystal molecules and the illustrated vertical directions being the short axis directions of the liquid crystal molecules.

The liquid crystal molecules have various characteristics (such as refractive indices, dielectric constants, magnetic susceptibilities, viscosities, absorbances, and conductivities) in the long axis directions and the short axis directions that are different from each other. The liquid crystal display device makes use of refractive index anisotropy and dielectric anisotropy among the various characteristics. In an aspect of the present invention, in view of such characteristics of the liquid crystal molecules, the linearly polarized light $L_B$ vibrating parallel to the short axis directions of the liquid crystal molecules 51a disposed at the light-incident surface of the liquid crystal layer 50 of the liquid crystal light valve 110B impinges upon the liquid crystal layer 50 of the liquid crystal light valve 10B irradiated with blue light having high energy and high intensity, so that it is possible to restrict absorption of light by the liquid crystal molecules and to effectively reduce or prevent deterioration of the liquid crystal molecules 51.

As a specific device to define the polarization directions of incident light, which are shown in FIGS. 5(A) and 5(B), for example, a polarizer having a polarization axis in a predetermined direction (that is, a direction perpendicular to the figure plane in FIG. 5(A) and a direction parallel to the figure plane in FIG. 5(B)) may be disposed adjacent to the outer surface of the substrate body 10A of each liquid crystal panel, and a polarization conversion element may be disposed on an optical axis between each liquid crystal light valve and the light source 101. When the alignment layer 40 of each liquid crystal light valve is formed of an organic material, such as polyimide, a specific method to define the alignment direction of the liquid crystal molecules 51a includes a controlling method based on a rubbing direction, whereas, when the alignment layer 40 of each liquid crystal light valve is formed of an inorganic material, such as $SiO_2$, a specific method to define the alignment direction of the liquid crystal molecules 51a includes a controlling method based on a deposition direction when carrying out oblique deposition. In other words, when realizing the structure shown in FIG. 5(Aa), a polarizer having a polarization axis that is perpendicular to the figure plane is disposed adjacent to the outer surface of the substrate 10A, and the alignment layer 40 is rubbed in a direction parallel to the drawing plane.

In the liquid crystal light valves 110R, 110G, and 110B in the exemplary embodiment, the liquid crystal layers 50 are made up of TN-mode liquid crystals that are twisted by 90 degrees, and displaying operations are performed by making use of an optical rotatory property of the liquid crystals. In such a display mode, even if linearly polarized light that is incident upon any of the liquid crystal layers 50 vibrates parallel to the long axis directions of the liquid crystal molecules 51a disposed at the light-incident surface (extraordinary light mode), or even if this linearly polarized light vibrates parallel to the short axis directions (ordinary light mode), similar display characteristics are exhibited except that slight changes occur in the viewing angle characteristic. Therefore, as in the exemplary embodiment, even if the liquid crystal light valve 110B for modulating blue light performs a displaying operation in the ordinary light mode, and the liquid crystal light valves 110R and 110G perform displaying operations in the extraordinary light mode, a difference does not occur between their display qualities.

Although, in the exemplary embodiment, as shown in FIG. 5(B), the liquid crystal light valves 110R and 110G for modulating red light and green light, respectively, are constructed to perform a displaying operation in the extraordinary light mode, the liquid crystal light valves 110R and 110G may obviously be constructed like the liquid crystal light valve 110B so that linearly polarized light vibrating parallel to the short axis directions is incident upon the liquid crystal molecules 51a disposed at the primary-light-incident surfaces of the liquid crystal layers 50.

However, if, as in the exemplary embodiment, the liquid crystal light valve 110B and the other liquid crystal light valves 10R and 110G are constructed so that their display modes differ, the rates of deterioration of the liquid crystals of the liquid crystal light valves 110R, 110G, and 110B can be made the same, so that changes with time in the color balance of the displayed images occur less frequently, thereby making it possible to provide a projection display device which can provide a high-quality display for a long period of time without having to frequently adjust the color balance.

Life Test of Liquid Crystal Light Valves

In this example, the lives of two types of liquid crystal panels, used as liquid crystal light valves 10B for modulating blue light of the projection display device of the exemplary embodiment, were checked. In each panel, the relationship between the alignment direction of liquid crystals disposed at a primary-light-incident surface of a liquid crystal layer and the polarization direction of primary light incident upon the liquid crystal layer was changed.

Figure 7:
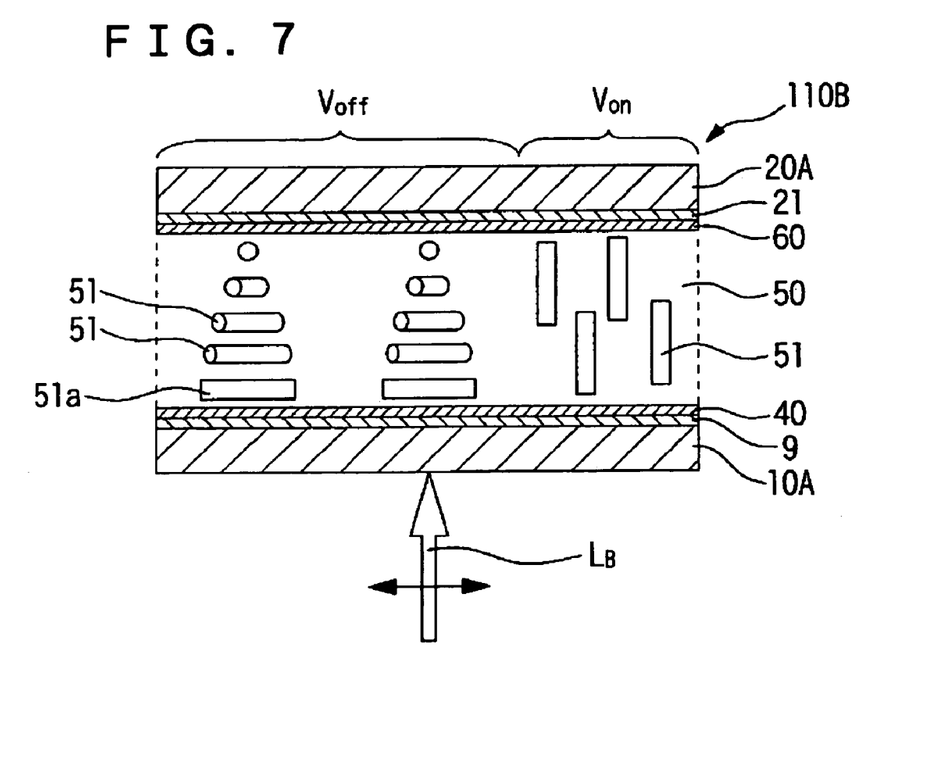
FIG. 7 is a schematic view of the structure of a panel in a life test of a liquid crystal light valve.
Figure 8:
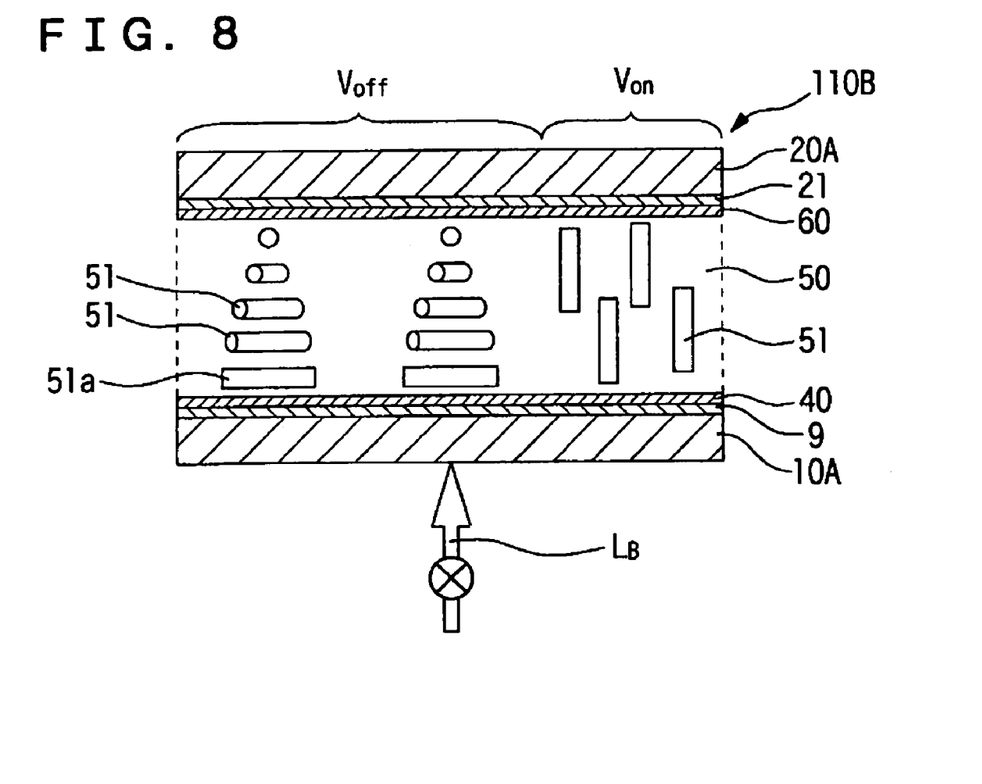
FIG. 8 is a schematic view of the structure of another panel in a life test of a liquid crystal light valve.

FIGS. 7 and 8 are schematic views of the structures of the panels in the life test of the liquid crystal light valves 110B. FIG. 7 shows an arrangement in which linearly polarized light $L_B$ parallel to the figure plane is incident upon liquid crystal molecules 51a parallel to the figure plane (extraordinary light mode), and FIG. 8 shows an arrangement in which linearly polarized light $L_B$ perpendicular to the figure plane is incident upon liquid crystal molecules 51a parallel to the figure plane (ordinary light mode).

In the life test, the lives of the liquid crystal light valves 110B for modulating blue light were tested by using an extra-high pressure mercury lamp as the light source 101 of the projection display device, and by variously changing its light intensity within a range of from 1000 lm to 50,000 lm as a result of adjusting electrical power supplied to the lamp. The life of each liquid crystal light valve was measured to determine the time for the brightness in a bright display to become ½ of the initial brightness.

The results of the measurements of the lives of the structures shown in FIGS. 7 and 8 are given in Tables 1 and 2, respectively. Conditions in which the lives are equal to or greater than 10,000 hours are judged as being "OK" in the tables, while conditions in which the lives are less than 10,000 hours are judged as being "no good" in the tables. This is because a life of 10,000 hours is required not only in projection display devices, but also in consumer appliances.

In the display in the ordinary light mode shown in FIG. 8 in the arrangement satisfying the requirements of the present invention, as shown in Table 2, even if the light source has an intensity of 20,000 lm, the liquid crystal light valve 110B has a long life of 32,000 hours. In addition, although the life is judged as being no good when the light source has an intensity of 50,000 lm, the liquid crystal light valve 110B has a life of 9,000 hours. In contrast, in the display in the extraordinary light mode shown in FIG. 7, as shown in Table 1, when the light source has an intensity of 10,000 lm, the liquid crystal light valve 110B has a life that is less than 10,000 hours. Therefore, it can be seen that the liquid crystal light valve 110B tends to deteriorate.

In this way, even if a strong light source having an intensity exceeding 10,000 lm is used, when the arrangement satisfies the requirements of an aspect of the present invention, it is possible to provide a projection display device having a very long life. Strong light sources, such as a metal halide lamp and an extra-high pressure mercury lamp, have an intense peak in the short wavelength region. According to the structure of the present invention, a light source having such a deviation of the spectral distribution may be applied to consumer appliances, so that it is possible to provide a projection display device having a wide color reproduction range.

TABLE 1

| | | | | | |
|---|---|---|---|---|---|
| LIGHT SOURCE INTENSITY (lm) (HIGH PRESSURE MERCURY LAMP) | 1,000 | 5,000 | 10,000 | 20,000 | 50,000 |
| LIFE OF LIQUID CRYSTAL LIGHT VALVE FOR MODULATING BLUE LIGHT (hr) | >100,000 | 50,000 | 9,800 | 2,500 | 200 |
| JUDGEMENT OF LIFE (OK WHEN LIFE EQUAL TO OR GREATER THAN 10,000 hr) | OK | OK | NO GOOD | NO GOOD | NO GOOD |

TABLE 2

| LIGHT SOURCE INTENSITY (lm) (HIGH PRESSURE MERCURY LAMP) | 1,000 | 5,000 | 10,000 | 20,000 | 50,000 |
|---|---|---|---|---|---|
| LIFE OF LIQUID CRYSTAL LIGHT VALVE FOR MODULATING BLUE LIGHT (hr) | >100,000 | >100,000 | 48,000 | 32,000 | 9,000 |
| JUDGEMENT OF LIFE (OK WHEN LIFE EQUAL TO OR GREATER THAN 10,000 hr) | OK | OK | OK | OK | NO GOOD |

What is claimed is:

1. A projection display device, comprising:
a light source;
a color separating device to separate light from the light source into a plurality of primary lights including a blue hue primary light; and
a plurality of liquid crystal light valves disposed in correspondence with the primary lights,
each liquid crystal light valve including a liquid crystal layer including twisted nematic liquid crystals having a twisted angle of approximately 90 degrees, and
the plurality of liquid crystal light valves including a certain light valve having a primary-light incident surface upon which the blue hue primary light falls incident, liquid crystal molecules disposed at the primary-light incident surface of the certain liquid crystal light valve being aligned substantially perpendicular to a polarization direction of the incident blue hue primary light.

2. A projection display device according to claim 1, the light source having an intensity that is equal to or greater than 10,000 lm.

3. A projection display device according to claim 1, the light source being either a metal halide lamp or an extra-high pressure mercury lamp.

4. A projection display device according to claim 1, further comprising:
a polarizer disposed at a primary-light incident side of the liquid crystal layer of the certain liquid crystal light valve, the polarizer having a polarization axis that is disposed substantially perpendicular to the alignment direction of the liquid crystal molecules disposed at the primary-light incident surface of the liquid crystal layer of the certain liquid crystal light valve.

5. A projection display device according to claim 1, the color separating device further separating lighy from the light source into other primary lights other than the blue hue primary light, the plurality of liquid crystal light valves further including other liquid crystal light valves disposed in correspondence with the other primary lights, each of the other liquid crystal light valves having a primary-light incident surface upon which a corresponding one of the other primary lights falls incident, liquid crystal molecules disposed at the primary-light incident surface of the other liquid crystal light valves being aligned substantially perpendicular to a polarization direction of the corresponding one of the other primary lights.

* * * * *